United States Patent
Lee et al.

(10) Patent No.: US 12,477,954 B2
(45) Date of Patent: Nov. 18, 2025

(54) RANDOM NUMBER GENERATOR USING STOCHASTIC MAGNETIC TUNNELING JUNCTION STRUCTURE

(71) Applicant: KOREA INSTITUTE OF SCIENCE AND TECHNOLOGY, Seoul (KR)

(72) Inventors: Ouk Jae Lee, Seoul (KR); Seok Min Hong, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 1084 days.

(21) Appl. No.: 17/491,972

(22) Filed: Oct. 1, 2021

(65) Prior Publication Data
US 2022/0165933 A1    May 26, 2022

(30) Foreign Application Priority Data
Nov. 26, 2020    (KR) .................. 10-2020-0160906

(51) Int. Cl.
*H10N 50/80*    (2023.01)
*G06F 7/58*    (2006.01)
*H10N 50/85*    (2023.01)

(52) U.S. Cl.
CPC ............ *H10N 50/80* (2023.02); *G06F 7/588* (2013.01); *H10N 50/85* (2023.02)

(58) Field of Classification Search
CPC .................................. G06F 7/58; G06F 7/588
See application file for complete search history.

(56) References Cited

U.S. PATENT DOCUMENTS

| 9,680,089 B1 * | 6/2017 | Chen | H10B 61/10 |
| 2010/0109660 A1 * | 5/2010 | Wang | G11C 11/161 |
| | | | 324/244 |

(Continued)

FOREIGN PATENT DOCUMENTS

| KR | 20140069195 A | 6/2014 |
| KR | 102134616 B1 | 7/2020 |

(Continued)

OTHER PUBLICATIONS

Zhang, Y. Spin Transfer Torque Induced Oscillation and Switching in Magnetic Tunnel Junction [Thesis or Dissertation]. Retrieved from the Internet: <URL: https://conservancy.umn.edu/bitstreams/9282f560-77f7-466d-9a66-5c1e34920325/download> (Year: 2014).*

(Continued)

*Primary Examiner* — Andrew Caldwell
(74) *Attorney, Agent, or Firm* — MARSHALL, GERSTEIN & BORUN LLP

(57) ABSTRACT

A random number generator using a stochastic magnetic tunneling junction structure is proposed. The random number generator includes: a first magnetic tunneling junction structure including a first pinned layer, a first tunnel junction layer, and a first free layer that are sequentially stacked, and stochastically having a parallel state and an anti-parallel state in which a magnetization direction of the first pinned layer and a magnetization direction of the first free layer is parallel and anti-parallel, respectively; and a first power supplier connected to the first magnetic tunneling junction structure and configured to supply AC voltage/current to the first magnetic tunneling junction structure.

6 Claims, 8 Drawing Sheets

(56) References Cited

U.S. PATENT DOCUMENTS

| | | | | |
|---|---|---|---|---|
| 2011/0062537 | A1* | 3/2011 | Oh | G11C 11/16 |
| | | | | 257/E29.323 |
| 2016/0055894 | A1* | 2/2016 | Houssameddine | G11C 29/838 |
| | | | | 365/158 |
| 2019/0347074 | A1* | 11/2019 | Choi | H10B 61/22 |

FOREIGN PATENT DOCUMENTS

| KR | 20200089542 A | 7/2020 |
|---|---|---|
| KR | 102142091 B1 | 8/2020 |

OTHER PUBLICATIONS

Wikipedia. Clock generator [online]. edited on Oct. 29, 2019. Retrieved from the Internet: <URL: https://web.archive.org/web/20200423210424/https://en.wikipedia.org/wiki/Clock_generator> (Year: 2019).*

Wikipedia. Electronic oscillator [online]. edited on Feb. 9, 2020. Retrieved from the Internet: <URL: https://web.archive.org/web/20200419220440/https://en.wikipedia.org/wiki/Electronic_oscillator> (Year: 2020).*

Semiengineering. LVDS (low-voltage differential signaling) [online]. Retrieved from the Internet: <URL: https://web.archive.org/web/20201031001104/https://semiengineering.com/knowledge_centers/communications-io/off-chip-communications/i-o-enabling-technology/lvds-low-voltage-differential-signaling/> (Year: 2020).*

Basic Electronics Tutorials. Comparator as a function generator _ Analog-integrated-circuits [online]. Retrieved from the Internet:<URL: https://web.archive.org/web/20201027061914/https://www.electronics-tutorial.net/analog-integrated-circuits/op-amp-comparators/comparator-as-a-function-generator/> (Year: 2020).*

University of Minnesota I. About the UDC—University Digital Conservancy. [online]. Retrieved from the Internet: <URL:https://web.archive.org/web/20210814190001/https://conservancy.umn.edu/pages/about/> (Year: 2021).*

University of Minnesota II. Dissertations and theses—How to find resources by format—Research Guides at University of Minnesota Minneapolis. [online]. Retrieved from the Internet: <URL: https://web.archive.org/web/20210729115150/https://libguides.umn.edu/FindResourcesbyFormat/dissertations> (Year: 2021).*

* cited by examiner

RANDOM NUMBER GENERATOR USING STOCHASTIC MAGNETIC TUNNELING JUNCTION STRUCTURE

CROSS REFERENCE TO RELATED APPLICATION

The present application claims priority to Korean Patent Application No. 10-2020-0160906, filed Nov. 26, 2020, the entire contents of which is incorporated herein for all purposes by this reference.

BACKGROUND OF THE INVENTION

Field of the Invention

The present disclosure relates to a random number generator using a stochastic magnetic tunneling junction structure.

STATEMENT OF GOVERNMENTAL SUPPORT

ID No.: 1711121354
Subject No.: 2020M3F3A2A01081635
Department: Ministry of Science and ICT
Subject Management (Professional) Agency: Team of Nano convergence, National Research Foundation of Korea
Project: Next-Generation Intelligence Semiconductor Technology Development
Project Subject: Random Nanomagnet-Based Stochastic Computing & Inverse Operation Logic Circuit Construction
Contribution Ratio: 1/1
Institute: KOREA INSTITUTE OF SCIENCE AND TECHNOLOGY
Research Period: 2020 Jul. 1~2021 Mar. 31

Description of the Related Art

Random numbers are very importantly used in games, simulations, encryption of data or financial transactions, etc. In the related art, a mid square method, a linear congruential method, a Mersenne Twister, etc. are used to create random numbers. However, random numbers created by these methods have periodicity and there is correlation between the created random numbers, it is possible to predict the next created number when knowing the last created random number and variable.

Meanwhile, recently, a memory device using a magnetic tunneling junction structure is getting attention as a next-generation technology.

A magnetic tunneling junction structure is a structure in which an insulating layer is disposed between two magnetic layers. One of the two magnetic layers has uniform magnetization directions fixed in a predetermined direction and the other one has magnetization directions that are parallel or anti-parallel, thereby storing information.

In relation to this structure, there is disclosed a spin injection torque magnetic memory including a first electrode, a vertical polarization magnetization pinned layer, a conductive spacer, a horizontal rotational magnetization free layer, an insulating spacer, a horizontal comparative fixed layer, and a second electrode that are sequentially stacked to configure magnetic tunnel junction between a word line and a bit line to have magnetic tunnel junction in a memory cell electrically connected to the bit line, the word line, and the source line in Korean Patent No. 10-2134616.

Further, in Korean Patent No. 10-2142091, there is disclosed a spin orbit torque magnetic memory that includes: at least one spin selection line disposed on a silicon substrate and causing spin orbit interaction therein; at least one first magnetic pattern disposed on a row line pattern; a second magnetic pattern disposed on the first magnetic pattern; a tunnel barrier disposed on the second magnetic pattern; and a third magnetic pattern disposed on the tunnel barrier, in which the first magnetic pattern is made of a cobalt (Co) film, the first magnetic pattern and the second magnetic pattern has a total of 5 nm thickness as a free layer, and the third magnetic pattern is a pinned layer with a fixed magnetization direction.

SUMMARY OF THE INVENTION

However, all of the prior art documents relate to a technology for using the memories as a memory device by keeping a magnetic tunneling junction structure in a stable state by controlling the magnetization directions of the magnetic tunnel junction structure to be parallel or anti-parallel.

An embodiment of the present disclosure provides a generator of true random numbers that are very difficult to predict, using an unstable magnetic tunneling junction structure.

A random number generator according to an embodiment of the present disclosure includes: a first magnetic tunneling junction structure including a first pinned layer, a first tunnel junction layer, and a first free layer that are sequentially stacked, and stochastically having a parallel state and an anti-parallel state in which a magnetization direction of the first pinned layer and a magnetization direction of the first free layer is parallel and anti-parallel, respectively; and a first power supplier connected to the first magnetic tunneling junction structure and configured to supply AC voltage/current to the first magnetic tunneling junction structure.

The first power supplier may be a clock generator.

The random number generator may further include a random number creator configured to create a random number on the basis of the result of comparing output voltage/current at an output terminal and reference voltage/current of the first magnetic tunneling junction structure.

The random number generator may further include a first inputter connected to an output terminal of the first magnetic tunneling junction structure and configured to create output voltage/current at the output terminal of the first magnetic tunneling junction structure in accordance with first input voltage/current.

The first power supplier may include a second magnetic tunneling junction structure including a second pinned layer, a second tunnel junction layer, and a second free layer that are sequentially stacked, and stochastically having a parallel state and an anti-parallel state in which a magnetization direction of the second pinned layer and a magnetization direction of the second free layer is parallel and anti-parallel, respectively, and the first power supplier may supply second output voltage/current at an output terminal of the second magnetic tunneling junction structure to the first magnetic tunneling junction structure.

A retention time of the parallel state and the anti-parallel state of the second magnetic tunneling junction structure may be larger than a retention time of the parallel state and the anti-parallel state of the first magnetic tunneling junction structure.

A retention time of the parallel state and the anti-parallel state of the second magnetic tunneling junction structure may be 10~1000 times a retention time of the parallel state and the anti-parallel state of the first magnetic tunneling junction structure.

The random number generator may further include a second inputter connected to an output terminal of the second magnetic tunneling junction structure and configured to create second output voltage/current at the output terminal of the second magnetic tunneling junction structure in accordance with the second input voltage/current.

The first power supplier may further include a second random number creator configured to create a random number on the basis of the result of comparing the second output voltage/current and second reference voltage/current, and may supply output of the second random number creator to the first magnetic tunneling junction structure.

The first power supplier may further include a second power supplier connected to the second magnetic tunneling junction structure and configured to supply AC voltage/current to the second magnetic tunneling junction structure.

The second power supplier may be a clock generator.

A stochastic computing device according to an embodiment of the present disclosure includes the random number generator.

According to an embodiment of the present disclosure, it is possible to create a true random number that is very difficult to predict.

According to an embodiment of the present disclosure, a random number generator in which a gradual change of a characteristic of a magnetic tunneling junction structure is suppressed.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION OF THE INVENTION

Figure 1:
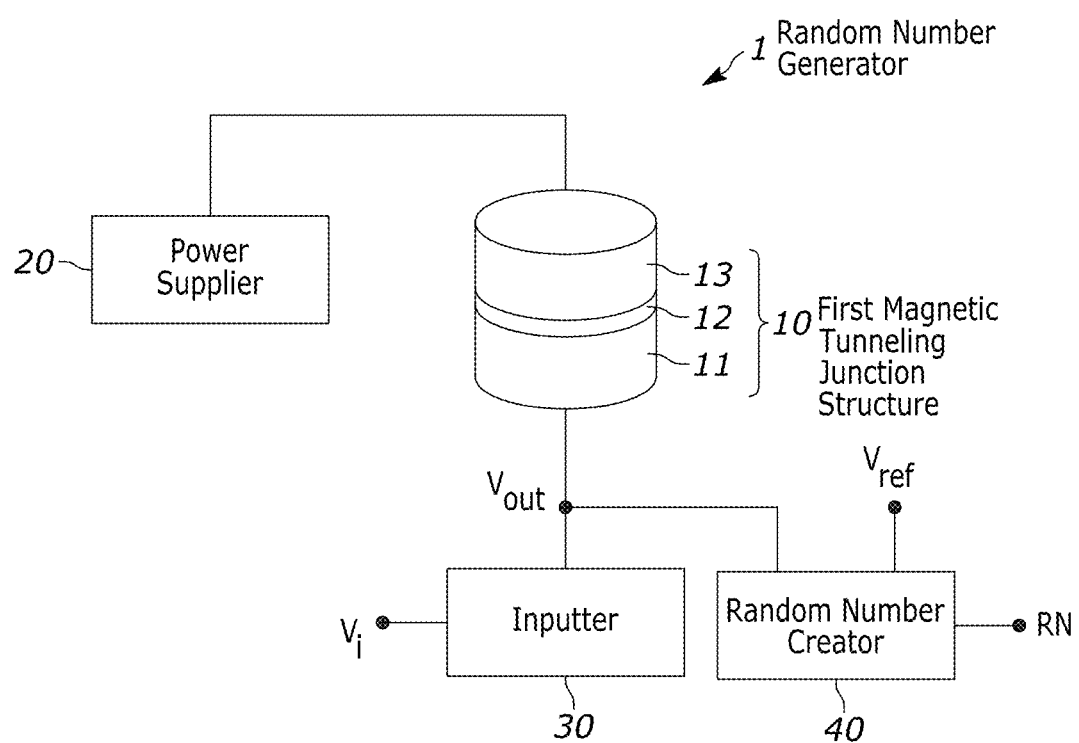
FIG. 1 is a diagram showing a random number generator according to an embodiment of the present disclosure.

FIG. 1 is a diagram showing a random number generator 1 according to an embodiment of the present disclosure.

Referring to FIG. 1, a random number generator 1 includes a magnetic tunneling junction structure 10 and a first power supplier 20. In accordance with an embodiment, the random number generator may additionally include at least one of an inputter 30 and a random number creator 40.

The magnetic tunneling junction structure 10 includes a pinned layer 11, a tunnel junction layer 12, and a free layer 13 that are sequentially stacked, and stochastically has a parallel state and an anti-parallel state in which the magnetization direction of the pinned layer 11 and the magnetization direction of the free layer 13 are parallel and anti-parallel, respectively. The magnetization direction of the pinned layer 11 has a fixed value, and the magnetization directions of the pinned layer 11 and the free layer 13 may be horizontal magnetization, vertical magnetization, or a combination thereof. The tunnel junction layer 12 electrically insulates the pinned layer 11 and the free layer 13. Parallel or anti-parallel arrangement of the magnetization direction of the free layer 13 and the magnetization direction of the pinned layer 11 may be achieved in any method such as spin transfer torque or a spin orbit torque.

The pinned layer 11 is made of a magnetic material and the magnetization direction thereof is fixed. The pinned layer 11 may include any one of Co, Py, CoFeB, Co/Ru/Co/PtMn, Py/Ru/Py/PtMn, and CoFeB/Ru/CoFeB/PtMn. The tunnel junction layer 12 is made of an insulating material and may include at least one of MgO, AlOX, and HfOX. The free layer 13 is made of a magnetic material and has a magnetization direction that is parallel or anti-parallel with the pinned layer 11. The free layer 13 may include at least one of Co, Py, CoFeB, Co/Ru/Co/PtMn, Py/Ru/Py/PtMn, and CoFeB/Ru/CoFeB/PtMn or may include at least one of terbium (Tb), dysprosium (Dy), samarium (SM), and holmium (Ho) in a cobalt-ferrum-boron (CoFeB) alloy film. However, the materials of the pinned layer 11, the tunnel junction layer 12, and the free layer 13 are only examples, and any materials can be used as long as the magnetization direction can have a parallel state or an anti-parallel state.

Though not shown in the figures, electrodes for supplying current/voltage to the magnetic tunneling junction structure 10 may be connected to both ends of the magnetic tunneling junction structure 10. The electrodes are made of a conductive material, and for example, may include at least one of Ta/Ru, Ta/Pt, (Ta/Cu)XN/Ta, (Ta/CuN)XN/Ta, and (Ta/Ru)XN/Ta.

The first power supplier 20 is connected to the magnetic tunneling junction structure 10 and supplies DC voltage/current to the magnetic tunneling junction structure 10. The first power supplier 20 supplies bias voltage/current to the magnetic tunneling junction structure 10.

The inputter 30 is connected to the output terminal of the magnetic tunneling junction structure 10 and generates output voltage/current at the output terminal of the magnetic tunneling junction structure 10 in accordance with input voltage/current.

The random number creator 40 creates random a number on the basis of the result of comparing the output voltage/current at the output terminal and reference voltage/current of the magnetic tunneling junction structure 10.

FIGS. 2A to 4C are diagrams illustrating the stochastic state of the magnetic tunneling junction structure 10 shown in FIG. 1.

Figure 2A:
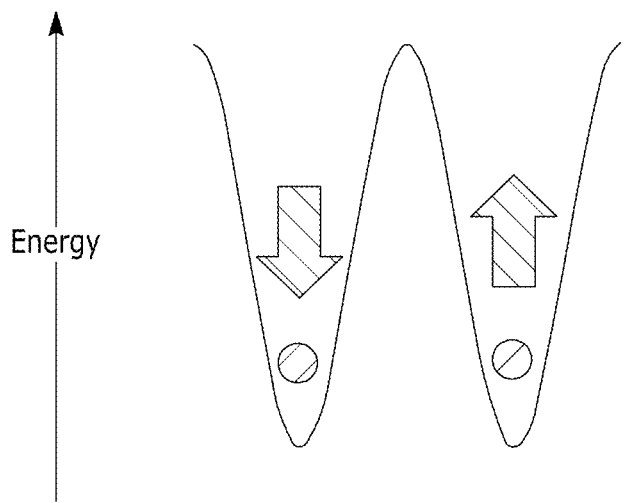
FIGS. 2A and 2B are diagrams illustrating the energy state of a magnetic tunneling junction structure.
Figure 2B:
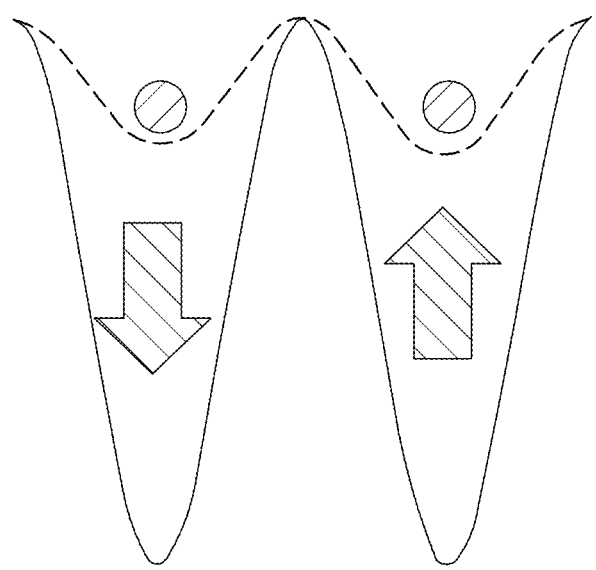

FIG. 2A is a diagram showing the energy of a free layer 13 in a stable state according to the related art and FIG. 2B is a diagram showing the energy of the free layer 13 in an unstable state according to an embodiment of the present disclosure. In FIGS. 2A and 2B, any one of the upward arrow and the downward arrow indicates the state in which magnetization directions are parallel and the other one indicates the state in which magnetization directions are anti-parallel.

Referring to FIG. 2A, when the free layer 13 of a magnetic tunneling junction structure 10 is in a stable state, for example, a high energy barrier of 50 kT exists between the parallel state and the anti-parallel state. Accordingly, the magnetic tunneling junction structure 10 can stable maintain the parallel state and the anti-parallel state.

However, referring to FIG. 2B, when the free layer 13 of the magnetic tunneling junction structure 10 is in an unstable state, for example, a low energy barrier of 1 kT exists between the parallel state and the anti-parallel state. Accordingly, the parallel state and the anti-parallel state randomly fluctuate, so they can be switched every short time of several ms~several ns.

Figure 3:
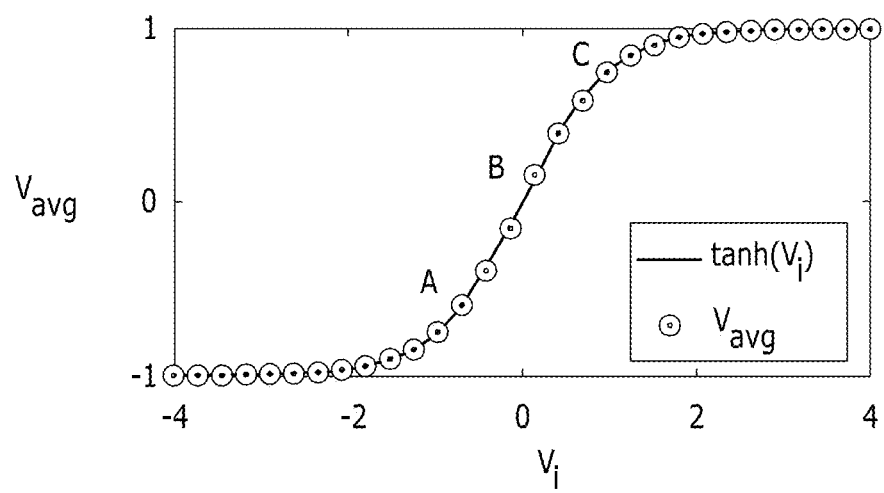
FIG. 3 is a graph showing an example of the relationship of the average values of a voltage applied to the magnetic tunneling junction structure shown in FIG. 1 and an output voltage.
Figure 4A:
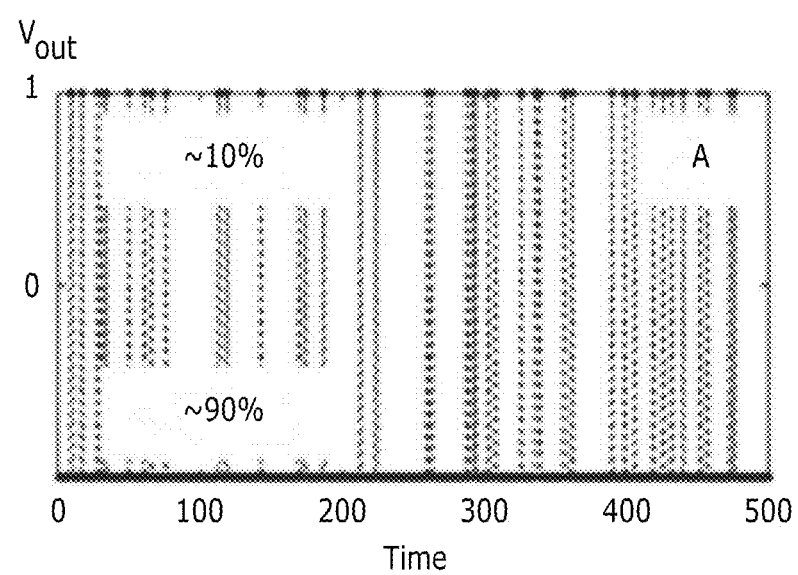
FIGS. 4A, 4B, and 4C are diagrams showing output voltages over time when input voltages are input to the points A, B, and C shown in FIG. 3, respectively.
Figure 4B:
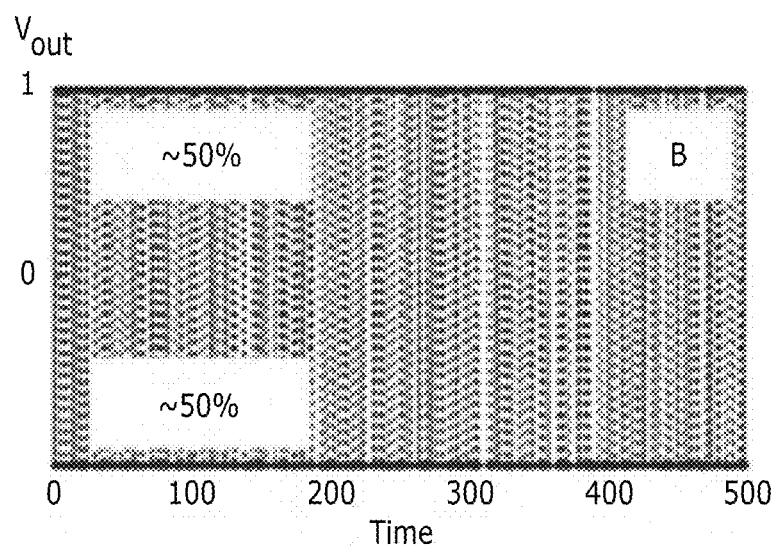
Figure 4C:
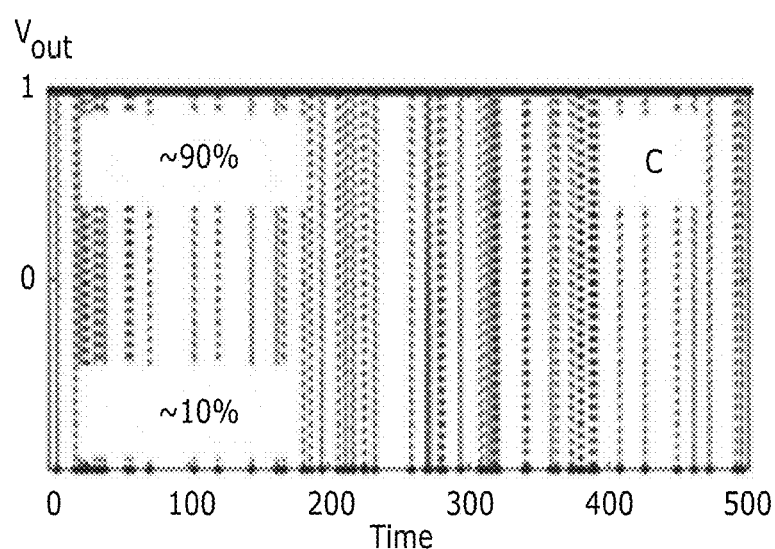

FIG. 3 is a graph showing an example of the relationship of average values Vavg of a voltage Vi (across a range of −4V to 4V) applied to the magnetic tunneling junction structure 10 shown in FIG. 1 and an output voltage and FIGS. 4A, 4B, and 4C are diagrams showing output voltages over time when input voltages Vi of −1V, 0V, and 1V are input to the points A, B, and C shown in FIG. 3, respectively. For the convenience of description, it is assumed that the output voltage Vout is −1 when the magnetic tunneling junction structure 10 is in a parallel state and the output voltage Vout is 1 when the magnetic tunneling junction structure 10 is in an anti-parallel state in FIGS. 4A, 4B, and 4C. However, when the output voltage Vout may be 1 when the magnetic tunneling junction structure 10 is in a parallel state and the output voltage Vout may be −1 when the magnetic tunneling junction structure 10 is in an anti-parallel state.

First, referring to FIG. 4A, when an input voltage of −1V is input, the magnetic tunneling junction structure 10 switches into states in which magnetization directions are parallel and are anti-parallel, the total of the period when magnetization directions are parallel for a predetermined time is about 90% of the predetermined time, and the total of the period when magnetization directions are anti-parallel is about 10% of the predetermined time. Accordingly, as shown by the point A in the graph of FIG. 3, the average value of the output voltage Vavg is about −0.8 for the predetermined time.

Referring to FIG. 4B, when an input voltage of 1V is input, the magnetic tunneling junction structure 10 switches into states in which magnetization directions are parallel and are anti-parallel, the total of the period when magnetization directions are parallel and the total of the period when magnetization directions are anti-parallel for a predetermined time are each about 50% of the predetermined time. Accordingly, as shown by the point B in the graph of FIG. 3, the average value of the output voltage Vavg is about 0 for the predetermined time.

Referring to FIG. 4C, when an input voltage of 0V is input, the magnetic tunneling junction structure 10 switches into states in which magnetization directions are parallel and are anti-parallel, the total of the period when magnetization directions are parallel for a predetermined time is about 10% of the predetermined time, and the total of the period when magnetization directions are anti-parallel is about 90% of the predetermined time. Accordingly, as shown by the point C in the graph of FIG. 3, the average value of the output voltage Vavg is about 0.8 for the predetermined time.

That is, FIG. 3 shows an average for a predetermined time of an output voltage according to an input voltage, and the output voltage of each point in time within the predetermined time shows −1 or 1.

The random number generator according to an embodiment of the present disclosure may be set such that the average of an output voltage Vavg has a predetermined value by appropriately setting Vi. For example, Vi may be set such that the average Vavg of an output value is 0.

Figure 5:
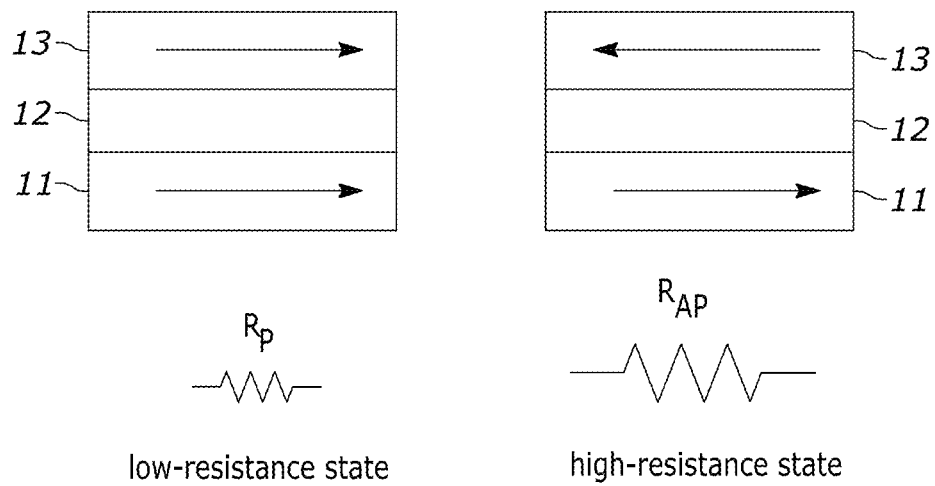
FIG. 5 is a diagram illustrating an equilibrium state and an anti-equilibrium state of the magnetic tunneling junction structure shown in FIG. 1.

FIG. 5 is a diagram illustrating an equilibrium state and an anti-equilibrium state of the magnetic tunneling junction structure 10 shown in FIG. 1.

In FIG. 5, the case when the magnetic tunneling junction structure 10 has an equilibrium state is shown at the left side and the case when the magnetic tunneling junction structure 10 has an anti-equilibrium state is shown at the right side.

As shown in FIG. 5, when the magnetic tunneling junction structure 10 is in an equilibrium state, the magnetic tunneling junction structure 10 can be expressed as an equivalent resistor Rp, and when the magnetic tunneling junction structure 10 is an anti-equilibrium state, the magnetic tunneling junction structure 10 can be expressed as an equivalent resistor Rap. Since Rp>Rap is generally satisfied, as the magnetic tunneling junction structure 10 switches into the parallel state and the anti-parallel state, the output voltage Vout also fluctuates, and accordingly, random numbers RN can be created.

Figure 6:
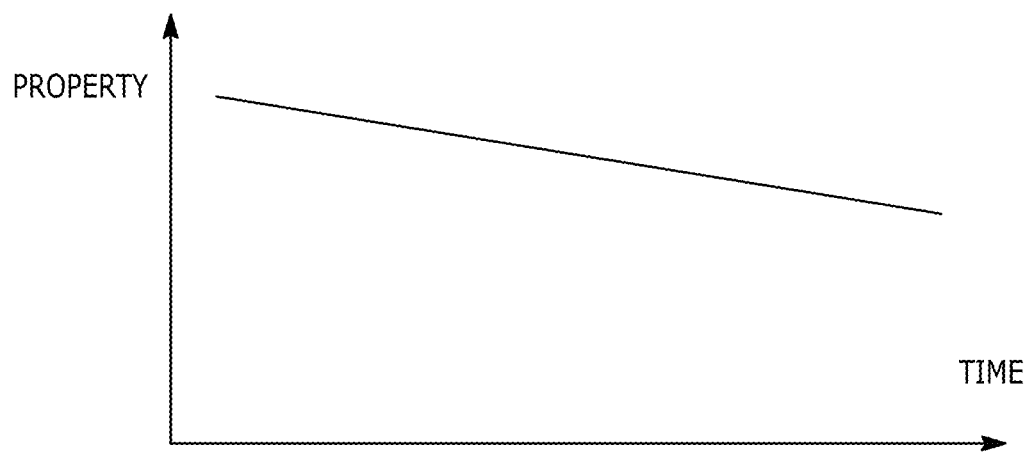
FIG. 6 is a graph showing an example of a characteristic value of a magnetic tunneling junction structure over time when a power supplier is a DC power source in accordance with a comparative example.

FIG. 6 is a graph showing an example of a characteristic value of a magnetic tunneling junction structure 10 over time when a first power supplier 20 is a DC power source in accordance with a comparative example;

The characteristic value of the magnetic tunneling junction structure 10 may be, for example, any one of the equivalent resistor Rp when the magnetic tunneling junction structure 10 is in a parallel state, the equivalent resistor Rap when the magnetic tunneling junction structure 10 is in an anti-parallel state, and the output voltage/current of the magnetic tunneling junction structure 10.

When a predetermined bias voltage/current is applied to the magnetic tunneling junction structure 10, the characteristic value of the magnetic tunneling junction structure 10 may gradually change for a long time. In order to solve the problem of soft migration that is a characteristic of the magnetic tunneling junction structure 10, the present disclosure provides a first power supplier 20 that is an AC power source.

Figure 7:
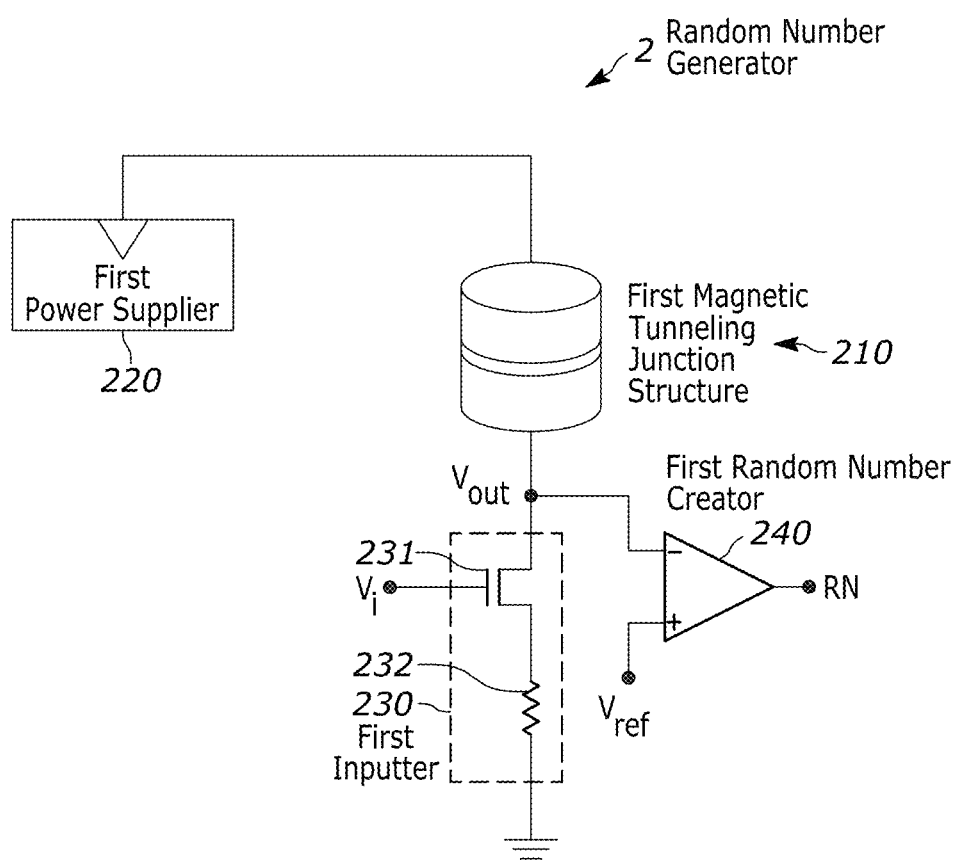
FIG. 7 is a diagram showing a random number generator according to an embodiment of the present disclosure.

FIG. 7 is a diagram showing an example of a random number generator 2 according to an embodiment of the present disclosure.

Referring to FIG. 7 a random number generator 2 includes a magnetic tunneling junction structure 210, a first power supplier 220, an inputter 230, and a random number creator 240.

The magnetic tunneling junction structure 210 is the same as the magnetic tunneling junction structure 10 shown in FIG. 1, so it is not described in detail.

The first power supplier 220 supplies a bias voltage to the magnetic tunneling junction structure 210 and, for example, may be a clock generator.

The inputter 230 may include a transistor 231 and the resistor 232 that supply a current to the magnetic tunneling junction structure 210 in accordance with an input voltage Vi. Although a Metal Oxide Semiconductor Field Effect Transistor (MOSFET) was used in FIG. 7, the present disclosure is not limited thereto, any one of various kinds of transistors including a Field Effect Transistor (FET) such as a Junction Field Effect Transistor (JFET) or a bipolar transistor may be used, and it may be selected in consideration of the characteristics between a gate voltage and a drain-source current, sensitivity to temperature, size, ease of process, etc. Further, not only the n-channel 231 transistor shown in FIG. 7, but a p-channel transistor may be used as the transistor 231.

In this case, the input voltage Vi is applied to the gate of the n-channel transistor 231. The input voltage Vi may be appropriately set such that the voltage level of the output voltage Vout has a desired level.

The random number creator 240 may be a comparer that has an output voltage Vout and a reference voltage Vref as input voltages and creates a random number of "−1" or "1" in accordance with the result of comparing the input voltages. The reference voltage Vref may be set as the middle value of the output voltage Vout.

Figure 8:
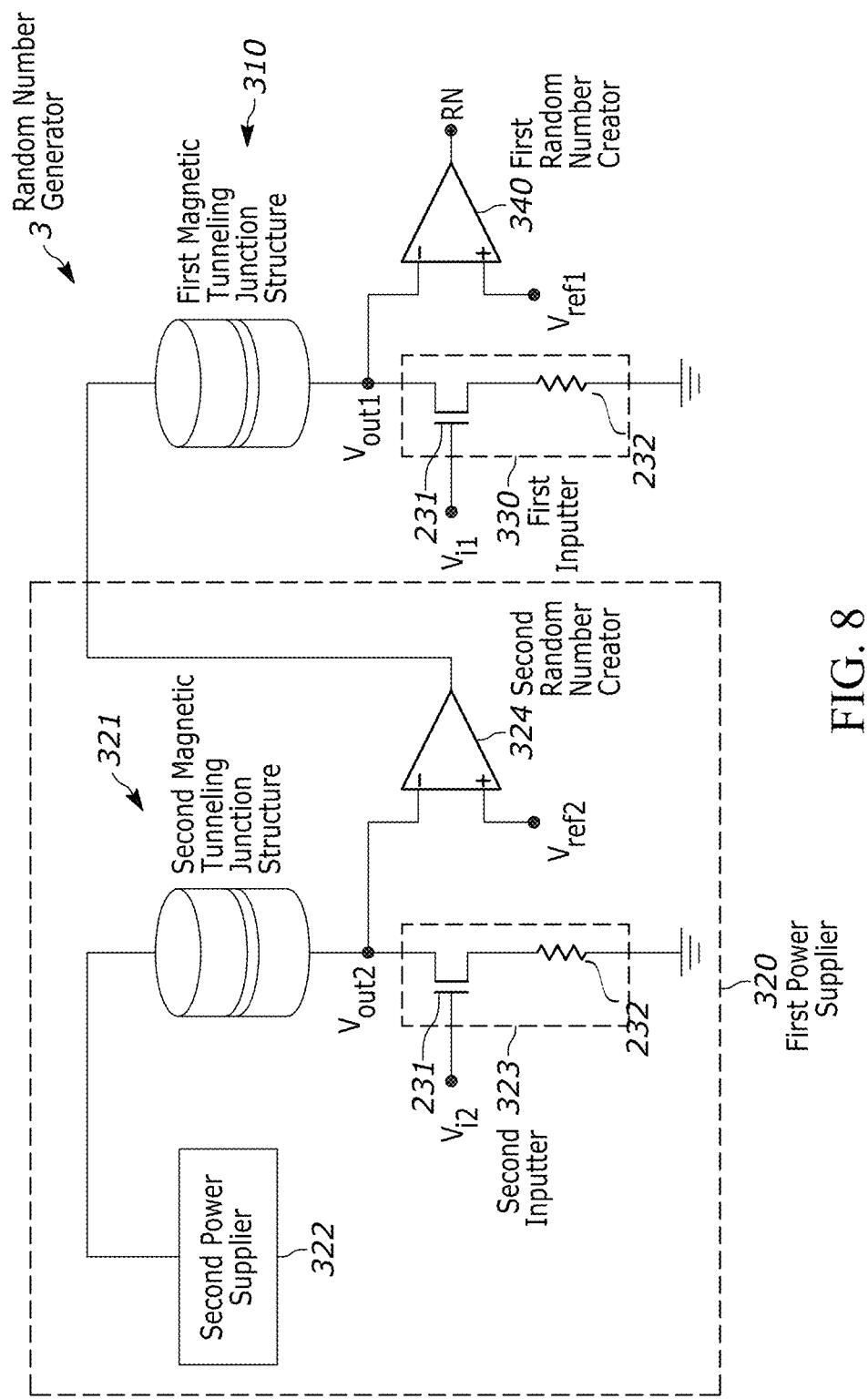
FIG. 8 is a diagram showing a random number generator according to an embodiment of the present disclosure.

FIG. 8 is a diagram showing an example of a random number generator 3 according to an embodiment of the present disclosure.

Referring to FIG. 8 a random number generator 3 includes a magnetic tunneling junction structure 310, a first power supplier 320, an inputter 330, and a random number creator 340.

The magnetic tunneling junction structure 310, the inputter 330, and the random number creator 340 are the same as the magnetic tunneling junction structure 210, the inputter 230, and the random number creator 240 shown in FIG. 7, so they are not described in detail.

The first power supplier 320 supplies bias voltage/current to the magnetic tunneling junction structure 310, and may include a magnetic tunneling junction structure 321, as shown in FIG. 8.

As described above, as the magnetic tunneling junction structure 321 switches into a parallel state and an anti-parallel state, the output voltage Vout2 changes, and accordingly, a bias voltage that is AC can be provided to the magnetic tunneling junction structure 310.

The first power supplier 320 may additionally include a power supplier 322 (a second power supplier), an inputter 323, and a random number creator 324. The inputter 323 and the random number creator 324 are the same as the inputter 230 and the random number creator 240, so they are not described in detail. An input voltage Vi2 that is input to the inputter 323 in the first power supplier 320 and an input voltage Vi1 that is input to the inputter 330 may be the same or not. A reference voltage Vref2 that is input to the random number creator 324 may be set as a substantially middle value of the output voltage Vout2 of the magnetic tunneling junction structure 321.

The second power supplier 322 is provided to supply bias voltage/current to the magnetic tunneling junction structure 321, and it may be a DC power source or an AC power source. A characteristic may gradually change in the magnetic tunneling junction structure 321 in the first power supplier 320. Accordingly, the second power supplier 322 that supplied bias voltage/current to the magnetic tunneling junction structure 321 may be AC power source.

A retention time of the time when the magnetic tunneling junction structure 321 for providing AC power to the magnetic tunneling junction structure 310 stays in a parallel state and an anti-parallel state may be larger than the retention time of the time when the magnetic tunneling junction structure 310 stays in a parallel state and an anti-parallel state. This is for stably providing an output voltage Vout value, and is for preventing a change of an output voltage Vout of a specific value while the output voltage Vout is output when the retention time of the magnetic tunneling junction structure 321 is smaller than the retention time of the magnetic tunneling junction structure 310. For example, the retention time of the magnetic tunneling junction structure 321 may be 10 to 1000 times the retention time of the magnetic tunneling junction structure 310. When it is smaller than 10 times, the output voltage Vout excessively changes, and when it is larger than 1000 times, it may be difficult to the effect of suppressing a change of the characteristic of the magnetic tunneling junction structure 310.

Figure 9:
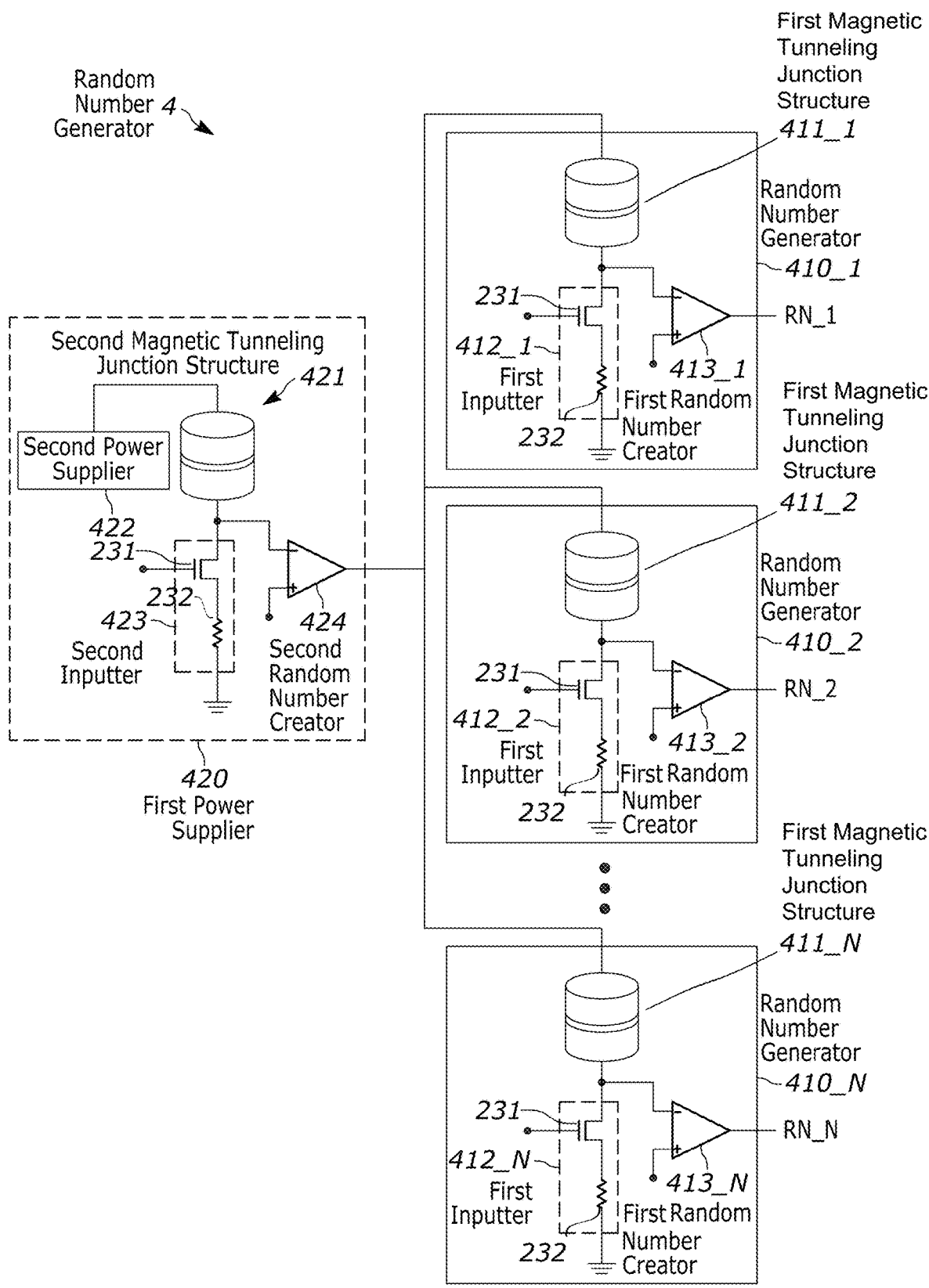
FIG. 9 is a diagram showing a random number generator according to an embodiment of the present disclosure.

FIG. 9 is a diagram showing an example of a random number generator 4 according to an embodiment of the present disclosure.

Referring to FIG. 9, a random number generator 4 includes a plurality of random number generators 410_1~410_N and a first power supplier 420.

The random number generators 410_1~410_N include magnetic tunneling junction structures 411_1~411_N, inputters 412_1~412_N, and random number creators 413_1~413_N, respectively, and these correspond to the magnetic tunneling junction structure 310, the inputter 330, and the random number creator 340, so they are not described in detail. The random number generators 410_1~410_N output random numbers RN_1~RN_N, respectively.

The first power supplier 420 supplies a common AC bias voltage to the random number generators 410_1~410_N, and may include a magnetic tunneling junction structure 421, a second power supplier 422, an inputter 423, and a random number creator 424. The magnetic tunneling junction structure 421, the second power supplier 422, the inputter 423, and the random number creator 424 may correspond to the magnetic tunneling junction structure 321, the second power supplier 322, the inputter 323, and the random number creator 324 shown in FIG. 8, respectively.

The random number generator 4 shown in FIG. 9 may create a plurality of bits of random numbers.

The random number generators 1, 2, 3, and 4 according to an embodiment of the present disclosure may be used to a stochastic computing device. The stochastic computing device is a computing device that uses devices that output stochastic bits such as the random number generators 1, 2, 3, and 4 according to an embodiment of the present disclosure. The stochastic computing device may be used for a non-deterministic complete/hard problem, a Boltzmann machine in machine learning, optimization using a classical annealing problem, an invertible Boolean logic being able to perform inverse operation, optimization using quantum Boltzmann law, etc.

Although the present disclosure was described in detail through embodiments, the present disclosure is not limited thereto and it is apparent to those skilled in the art that the present disclosure may be changed and applied in various ways without departing from the spirit of the present disclosure. Accordingly, the protective range of the present disclosure should be construed by the following claims and the scope and spirit of the present disclosure should be construed as being included in the patent right of the present disclosure.

Although any one of a voltage and a current was specified as an example of an input voltage, an output voltage, a final output, etc. in the specification, it is apparent to those skilled in the art that the voltage and the current are values that can be switched. Accordingly, the input voltage, the output voltage, the final output, etc. may not one not exemplified herein of the voltage and the current.

What is claimed is:

1. A random number generator comprising:
a first magnetic tunneling junction structure including a first pinned layer, a first tunnel junction layer, and a first free layer that are sequentially stacked, and stochastically having a parallel state and an anti-parallel state in which a magnetization direction of the first pinned layer and a magnetization direction of the first free layer is parallel and anti-parallel, respectively, wherein the first free layer is configured to enter into an unstable state to cause the parallel state and the anti-parallel state to randomly fluctuate;
a first power supplier connected to the first magnetic tunneling junction structure and configured to supply AC voltage/current to the first magnetic tunneling junction structure,
wherein the first power supplier includes a second magnetic tunneling junction structure including a second pinned layer, a second tunnel junction layer, and a second free layer that are sequentially stacked, and stochastically having a parallel state and an anti-parallel state in which a magnetization direction of the second pinned layer and a magnetization direction of the second free layer is parallel and anti-parallel, respectively,
the first power supplier supplies second output voltage/current at an output terminal of the second magnetic tunneling junction structure to the first magnetic tunneling junction structure, and wherein at least one of:
 (1) a retention time of the parallel state and the anti-parallel state of the second magnetic tunneling junction structure is larger than a retention time of the parallel state and the anti-parallel state of the first magnetic tunneling junction structure; or
 (2) a retention time of the parallel state and the anti-parallel state of the second magnetic tunneling junction structure is 10~1000 times a retention time of the parallel state and the anti-parallel state of the first magnetic tunneling junction structure.

2. The random number generator of claim 1, further comprising a random number creator configured to create a random number on the basis of the result of comparing output voltage/current at an output terminal and reference voltage/current of the first magnetic tunneling junction structure.

3. The random number generator of claim 1, further comprising a first inputter connected to an output terminal of the first magnetic tunneling junction structure and configured to create output voltage/current at the output terminal of the first magnetic tunneling junction structure in accordance with first input voltage/current.

4. The random number generator of claim 1, further comprising a second inputter connected to an output terminal of the second magnetic tunneling junction structure and configured to create second output voltage/current at the output terminal of the second magnetic tunneling junction structure in accordance with the second input voltage/current.

5. The random number generator of claim 1, wherein the first power supplier includes a second random number creator configured to create a random number on the basis of the result of comparing the second output voltage/current and second reference voltage/current, and
supplies output of the second random number creator to the first magnetic tunneling junction structure.

6. The random number generator of claim 1, wherein the first power supplier further includes a second power supplier connected to the second magnetic tunneling junction structure and configured to supply AC voltage/current to the second magnetic tunneling junction structure.

* * * * *